July 9, 1929.    H. G. SCHULER    1,720,007
SAFETY CLUTCH MECHANISM FOR MOTOR VEHICLES
Filed July 19, 1927    2 Sheets-Sheet 2
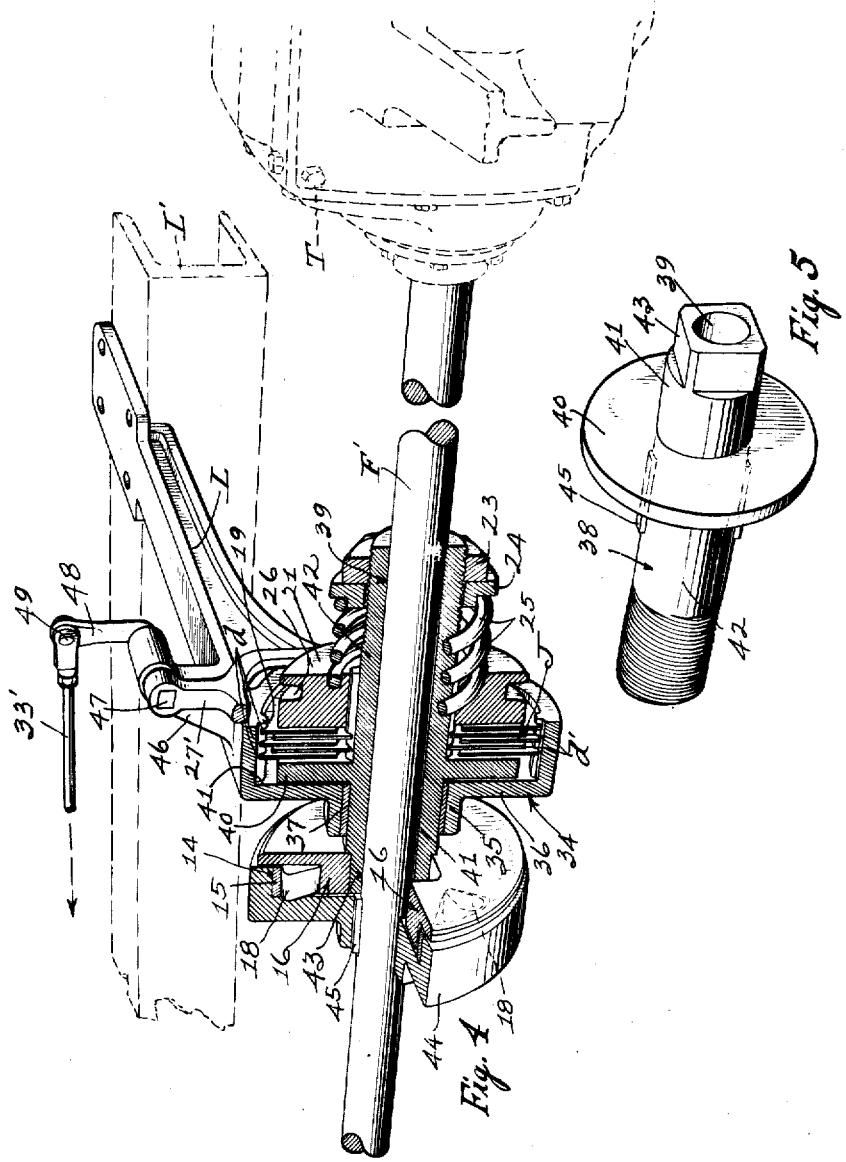
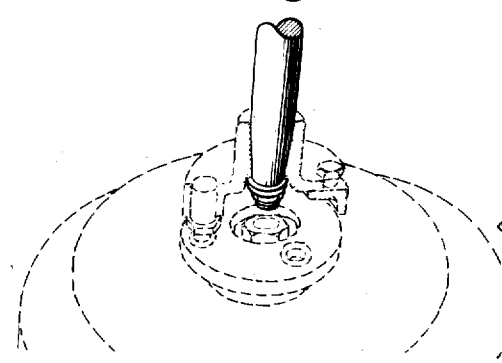
INVENTOR.
Howard G. Schuler,
BY
ATTORNEY.

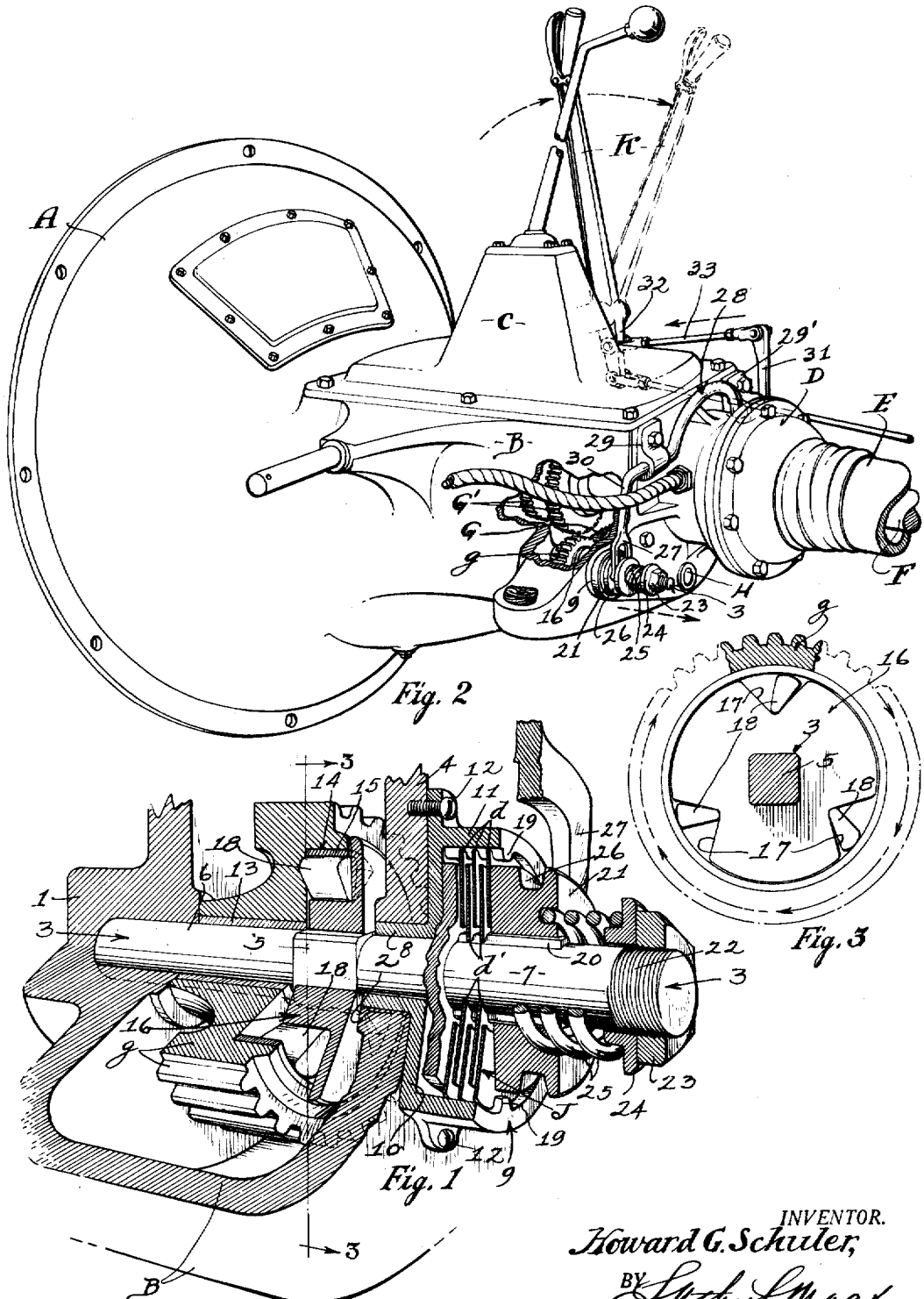

Patented July 9, 1929.

1,720,007

UNITED STATES PATENT OFFICE.

HOWARD G. SCHULER, OF LOS ANGELES, CALIFORNIA.

SAFETY CLUTCH MECHANISM FOR MOTOR VEHICLES.

Application filed July 19, 1927. Serial No. 206,929.

This invention relates in general to transmission devices for motor vehicles, and more particularly to a safety clutch device adapted to be employed in connection with the usual transmission, or built into a special type of transmission at some point between the crank shaft of the motor and the power driven axle.

The primary object is to provide a simple, economical and thoroughly efficient mechanism arranged to become automatically operative for preventing a movement of the car in backward direction when the car is geared for forward movement, and vice versa.

Another object is to provide an operative connection between the safety mechanism and the emergency brake of the vehicle, whereby the safety mechanism may be temporarily inoperative while a shift is effected from reverse to forward gear, or vice versa.

Another object is to provide a mechanism of the character mentioned so arranged that it will prevent a kick-back or reverse movement of the crank shaft of a motor when the motor is being cranked in a starting operation.

Other objects may appear as the description progresses.

In the accompanying drawings I have shown a preferred form of device embodying my invention, with modifications, and I conceive it to be possible to further modify the form, arrangement and structure of my improvements within the scope of the appended claims without departing from the spirit thereof.

In said drawings:

Fig. 1 is a perspective view, partly in section, of my improved safety clutch mechanism mounted on the usual transmission case of a motor.

Fig. 2 is a perspective view of the same in connection with the usual transmission and clutch mechanisms of a motor vehicle, showing particularly the connection between the safety mechanism and the emergency brake.

Fig. 3 is a transverse section of the mechanism on line 3—3 of Fig. 1.

Fig. 4 is a perspective view of a modified form of device applied to the propeller or intermediate driving shaft connecting the motor with the rear axle of a motor vehicle.

Fig. 5 is a perspective view of a sleeve adapted to be carried by the propeller shaft, and serving as a mounting for certain elements of my mechanism.

Referring now to Fig. 2, a represents the usual clutch case of a motor vehicle, which may be integrally formed with or separate from a transmission case B, having a cover C suitably attached thereto. Rearwardly of the transmission case B, the usual type of propeller shaft coupling D is provided which connects with the propeller shaft housing E, in which is mounted the propeller shaft F.

Within the transmission case B a cluster of gears as at G are mounted on a countershaft H, paralleling the main transmission shaft and adapted to selectively mesh with gears as at G', G', on said main transmission shaft, for effecting selective speed reduction between the transmission and the propeller shaft F.

One of the gears G meshes with a reverse idler gear $g$, which connects said gear $g$ with one of the gears G' on the main transmission shaft, so as to impart reverse motion to the propeller shaft F.

In Fig. 1 I have shown my safety clutch mechanism applied to the reverse idler gear $g$, but it will be understood that the mechanism may be applied with equal success to any of the gears G or G', or on any other driven element of a motor vehicle, with minor modifications.

The reverse idler gear $g$ is mounted between bearings 1 and 2 in the transmission case B, on a short shaft 3, which in usual cases does not extend rearwardly through the rear wall 4 of the transmission case B as shown in Fig. 1. In order to provide a transmission mechanism with my improvements I remove the original reverse idler gear shaft and supply a form of shaft in lieu thereof, as shown in Fig. 1 at 3. Said shaft has a centrally formed square portion 5 and end portions 6 and 7, which are journaled respectively, in the bearings 1 and 2. The portion 7 extends substantially outwardly from the rear wall 4 of the transmission case, through a hub 8 which is formed on a clutch case 9.

Said clutch case has a web portion 10 which abuts the wall 4 of the transmission case B, and an annular rim 11 which serves to enclose a clutch mechanism J. The case 9 is secured to the transmission case B by means of screws 12, 12, etc., or otherwise.

The reverse idler gear $g$ is mounted on the portion 6 of the shaft 3 between the bearing 1 and the central squared portion 5 of said shaft, and said gear is preferably provided with a suitable bushing 13 around the shaft 3. The right hand face of gear $g$ is provided with a counter-bore or recess 14 which preferably carries a hardened steel bushing 15, tightly fitted thereinto. Gear $g$, however, may be so made that the bushing 15 may be omitted.

Internally of the bushing 15 of gear $g$, and mounted on the squared portion 5 of shaft 3, I provide a clutch collar 16, as shown in Figs. 1 and 3. Said collar has a plurality of triangular peripheral recesses 17, 17, etc., in each of which is loosely held a wedge-shaped dog or cam 18. As shown in Fig. 3, the cams 18 are eccentrically formed on their outer peripheries, so that when the gear $g$ rotates in a clock-wise direction, as shown in Fig. 3, the collar 16 and shaft 3 will be non-rotative when the gear $g$ is rotated. When the gear $g$, however, is rotated in a counter-clockwise direction the inner peripheries of the bushing 15 in gear $g$ will frictionally grip the eccentrically formed peripheries of the cams or dogs 18 and effect the rotation of the collar 16 and shaft 3 with the gear $g$.

The clutch J externally of the transmission case B is provided with a plurality of non-rotatable discs $d$, $d$, etc., and a plurality of alternating rotatable discs $d'$, $d'$, etc. The discs $d$ are slidably held in the member 9 and are keyed thereto at one or more points 19, 19, while the discs $d'$ are keyed at 20 to the portion 7 of shaft 3.

Externally of the clutch discs $d$ and $d'$, I provide a shaft collar 21 which is fixed to the shaft 3 for rotation therewith, by means of a key 20, and the inner face of which engage the outermost disc $d$ of the clutch J.

The outer end of shaft 3 is threaded at 22 to receive an adjusting nut 23, and internally of said nut a flanged collar 24 is loosely mounted on the portion 7 of shaft 3, between which and the outer face of collar 21 a compression spring 25 is mounted for the purpose of normally holding the clutch discs $d$ and $d'$ in engagement. The collar 21 has an annular groove 26 on the periphery thereof adapted to receive a fork 27 which is either formed on or suitably attached to a rod 28 which is journaled in brackets 29 and 29' on the rear side of the transmission case B.

The fork 27 is formed on a depending arm 30 of rod 28, while the opposite portion of said rod has an upwardly extending portion 31 adapted to be connected with the lower arm 32 of an emergency brake lever K, by means of a connecting rod 33, as shown in Fig. 2. The connection between the brake clutch J and the lever K is such that when the lever K is moved rearwardly into the position shown in broken lines in Fig. 2, the clutch discs $d$ and $d'$ will be disengaged, and when said lever is in the position shown in full lines in Fig. 2, said discs will be engaged and so held by the tension of the spring 25.

Thus, when the vehicle is moving in a forward direction, the gear $g$ will rotate in a clockwise direction, as shown in Fig. 3, but the shaft 3 and collar 16 will be held against rotation by reason of the operative engagement of the clutch J with the shaft 3. However, when the gear $g$ tends to move in a counter-clockwise direction the backward movement of the car and a reverse rotation of said gear would be prevented by the engagement of the clutch J. In such case the gear $g$ would be gripped by the dogs or cams 18, for instance, if a vehicle should become stalled or the movement thereof stopped when ascending a grade, and while the car is in forward gear, the backward movement of the car down the grade would be automatically prevented by the engagement between the gear $g$ and the cams 18 on collar 16.

In such case if the vehicle had been proceeding up a grade in a high or intermediate gear, and the car became stalled by reason of the failure or neglect to shift into a low gear, the emergency brake lever K or a special lever may be operated for disengaging the clutch discs $d$ and $d'$ of clutch J, so that a shift may be effected to any other desired gear.

It will be understood in this connection, that in a case such as that described the weight of the car would be on the teeth of the transmission gears, and it would be difficult, if not quite impossible, to effect a shift of gear under such conditions. The employment of the emergency brake, however, for holding the car while a shift is being effected removes the strain from the transmission gears and permits a shift of gears to a desired speed. Following this operation, restoration of the emergency brake lever K to normal position will re-engage the clutch discs $d$ and $d'$ and render the safety clutch device again effective.

Under some conditions a car may become stalled against an obstacle such as a tree or wall, and were it not for the connection between my safety clutch mechanism and the lever K, it would be impossible to move the car in either direction, due to the fact that the clutch J would hold the car stationary. The connection with the lever K, however, insures the freedom of movement of the car in any event, and a freedom of shift of gears from any speed to any other speed, forward or reverse.

Referring now to Fig. 4 of the drawing, it will be observed that I have shown a modified form of device which is particularly applicable to trucks or other types of motor cars, whereby the transmission as at T is mounted either on the rear axle or at a point between the rear axle and the motor. In this type of device I may provide a special transverse frame member L, which is suitably mounted on the longitudinal frame members as at L'. Member L may be provided with an integrally formed housing or case as at 34, substantially conforming to the member 11 shown in Fig. 1.

The portion 34 of member L is formed concentric with the clutch drive shaft F', and has a bearing 35 extended outwardly from the web 36 thereof, in which is mounted a bushing 37. Said bearing carries a sleeve 38 which is bored at 39 to receive the shaft F' and is arranged to turn on said shaft.

The sleeve 38 has an intermediate flange 40 thereon which abuts the inner face 41 of the member 34, and is additionally provided with a bearing portion 41 rotatably mounted in the hub 37, and an oppositely extended portion 42. The portion 41 terminates in a squared end portion 43 on which is held the clutch collar 16, carrying the cams or dogs 18, 18, etc., while adjacent said collars 16 I provide a cooperating clutch collar 44 which is keyed to the clutch drive shaft F' by means of the key 45.

Internally of the case 34 the discs $d$, $d$ and $d'$, $d'$, etc., of the clutch J are mounted, as in the form of device shown in Fig. 1, and said clutch includes the nut 23, collar 24, spring 25, and shift collar 26 shown in the other form of device, and arranged substantially in the same manner. In this form of device, however, the member L may be provided with an up-standing lug 46 on which is pivotally mounted a shaft 47 carrying a suitable clutch operating fork as at 27'.

Shaft 47 also has on its other end an arm 48 pivotally connected at a point 49 with a connecting rod 33' arranged for connection with the emergency brake lever K.

The only differences between the forms of devices shown in Figs. 1 and 4, reside in the fact that the clutch collar 44 is substituted for the reverse idler gear $g$.

Thus, it will be observed that I have provided a thoroughly satisfactory, efficient and economical safety mechanism adapted to be readily applied to motor vehicles, and capable of being arranged to be built-into vehicles during the process of construction, or applied to vehicles already constructed with equal success. The clutch J serves as a brake or retarding device for the clutch member 16 which normally prevents the rotation of said member 16 and renders the same inoperative at will so as to permit the rotation of the driven element in an opposite direction to its natural direction of rotation to permit the free shifting of the transmission gears.

What I claim is:

1. A transmission mechanism for motor vehicles including forward and reverse gearing, a safety clutch connected therewith for normally preventing the movement of the car in a direction contrary to the direction in which the transmission gears are engaged for moving the vehicle, and means operative at will for disengaging said clutch mechanism to permit the free shifting of said gears.

2. A transmission for motor vehicles comprising a transmission mechanism including forward and reverse gears, a safety clutch device connected with one of said gears and arranged to permit the free movement of said gear in a given direction, and to normally prevent the free movement thereof in an opposite direction, and means for rendering said clutch mechanism operative and inoperative at will.

3. A transmission for motor vehicles including forward and reverse gears, a safety clutch device connected with one of said gears and normally operative for permitting the rotation of said gear in a given direction, and for preventing the rotation thereof in an opposite direction, and means for rendering said clutch device inoperative at will.

4. A transmission mechanism for motor vehicles including a driven element, a brake operating device for retarding the movement of said driven element, a clutch device connected with said driven element and normally arranged to permit the rotation thereof in only a single direction, and means associated with said clutch device and operably connected with said brake operating device for disengaging said clutch to permit the free rotation of the driven element in an opposite direction.

5. A transmission for motor vehicles comprising a driven element, a clutch device connected therewith and arranged to permit the free rotation of the driven element in a given direction, and prevent the rotation thereof in an opposite direction, a brake operating device for retarding and preventing the rotation of said driven element, and means operably connecting said brake operating device with said clutch, and operable at will for rendering the clutch inoperative to permit the rotation of the driven element in an opposite direction.

6. A transmission for motor vehicles comprising in combination with a transmission mechanism and a brake operating device, a clutch device operably connected with an element of said transmission, an auxiliary clutch normally cooperating with said clutch device for permitting the operation of said transmission in a given direction and preventing the operation thereof in an opposite direction, and means for operably connecting said brake operating device and said auxiliary clutch for controlling the operation of said first mentioned clutch.

7. A transmission mechanism for motor vehicles including a driven element, a clutch operating as a brake for retarding the movement of the driven element, a second clutch connected with said driven element and normally arranged to permit the rotation thereof in only one direction, and means for operating said first mentioned clutch for disengaging the second clutch to permit the free rotation of the driven element in an opposite direction.

8. A transmission mechanism for motor vehicles including a driven element, a clutch operating as a brake for retarding the movement of the driven element, a second clutch connected with said driven element and normally arranged to permit the rotation thereof in only one direction, means for operating said first mentioned clutch for disengaging the second clutch to permit the free rotation of the driven element in an opposite direction, a brake lever arranged for connection with a brake for retarding the movement of the vehicle, and means connecting said lever with said first mentioned clutch for rendering the brake operative when the clutch is disengaged, and vice versa.

HOWARD G. SCHULER.

DISCLAIMER 1,720,007.—*Howard G. Schuler*, Los Angeles, Calif. SAFETY CLUTCH MECHANISM FOR MOTOR VEHICLES. Patent dated July 9, 1929. Disclaimer filed February 19, 1932, by the assignee, *Carl F. Rauen.*

Hereby enters his disclaimer to that part of the specification of said patent embodying claims 1, 2, and 3 thereof which are in the following words.

"1. A transmission mechanism for motor vehicles including forward and reverse gearing, a safety clutch connected therewith for normally preventing the movement of the car in a direction contrary to the direction in which the transmission gears are engaged for moving the vehicle, and means operative at will for disengaging said clutch mechanism to permit the free shifting of said gears.

"2. A transmission for motor vehicles comprising a transmission mechanism including forward and reverse gears, a safety clutch device connected with one of said gears and arranged to permit the free movement of said gear in a given direction, and to normally prevent the free movement thereof in an opposite direction, and means for rendering said clutch mechanism operative and inoperative at will.

"3. A transmission for motor vehicles including forward and reverse gears, a safety clutch device connected with one of said gears and normally operative for permitting the rotation of said gear in a given direction, and for preventing the rotation thereof in an opposite direction, and means for rendering said clutch device inoperative at will."

[*Official Gazette March 22, 1932.*]

rotation of the driven element in an opposite direction.

8. A transmission mechanism for motor vehicles including a driven element, a clutch operating as a brake for retarding the movement of the driven element, a second clutch connected with said driven element and normally arranged to permit the rotation thereof in only one direction, means for operating said first mentioned clutch for disengaging the second clutch to permit the free rotation of the driven element in an opposite direction, a brake lever arranged for connection with a brake for retarding the movement of the vehicle, and means connecting said lever with said first mentioned clutch for rendering the brake operative when the clutch is disengaged, and vice versa.

HOWARD G. SCHULER.

DISCLAIMER 1,720,007.—*Howard G. Schuler*, Los Angeles, Calif. SAFETY CLUTCH MECHANISM FOR MOTOR VEHICLES. Patent dated July 9, 1929. Disclaimer filed February 19, 1932, by the assignee, *Carl F. Rauen*.

Hereby enters his disclaimer to that part of the specification of said patent embodying claims 1, 2, and 3 thereof which are in the following words.

"1. A transmission mechanism for motor vehicles including forward and reverse gearing, a safety clutch connected therewith for normally preventing the movement of the car in a direction contrary to the direction in which the transmission gears are engaged for moving the vehicle, and means operative at will for disengaging said clutch mechanism to permit the free shifting of said gears.

"2. A transmission for motor vehicles comprising a transmission mechanism including forward and reverse gears, a safety clutch device connected with one of said gears and arranged to permit the free movement of said gear in a given direction, and to normally prevent the free movement thereof in an opposite direction, and means for rendering said clutch mechanism operative and inoperative at will.

"3. A transmission for motor vehicles including forward and reverse gears, a safety clutch device connected with one of said gears and normally operative for permitting the rotation of said gear in a given direction, and for preventing the rotation thereof in an opposite direction, and means for rendering said clutch device inoperative at will."

[*Official Gazette March 22, 1932.*]